United States Patent [19]

Manassen et al.

[11] 4,421,835
[45] Dec. 20, 1983

[54] STORAGE OF ELECTRICAL ENERGY WITH TIN ELECTRODE SYSTEM, STORAGE APPARATUS, AND METHOD OF FORMING SUCH APPARATUS

[75] Inventors: Joost Manassen; Gary Hodes; David Cahen, all of Rehovot, Israel

[73] Assignee: Yeda Research and Development Co., Ltd., Rehovot, Israel

[21] Appl. No.: 256,547

[22] Filed: Apr. 22, 1981

[30] Foreign Application Priority Data

Apr. 25, 1980 [IL] Israel .................................. 59925

[51] Int. Cl.³ .......................................... H01M 6/36
[52] U.S. Cl. .................................. 429/111; 429/105; 429/149; 429/163; 429/73
[58] Field of Search .............. 429/106, 111, 149, 206, 429/207, 218, 163, 73

[56] References Cited

U.S. PATENT DOCUMENTS

| | | | |
|---|---|---|---|
| 4,064,326 | 12/1977 | Manassen et al. | 429/111 |
| 4,086,398 | 4/1978 | Cartmell et al. | 429/111 |
| 4,128,704 | 12/1978 | McKinzie et al. | 429/111 |
| 4,172,925 | 10/1979 | Chen et al. | 429/111 |
| 4,215,182 | 7/1980 | Ang et al. | 429/15 |
| 4,256,814 | 3/1981 | Avigal et al. | 429/111 |
| 4,259,418 | 3/1981 | Clark et al. | 429/111 |
| 4,262,066 | 4/1981 | Brenneman et al. | 429/111 |
| 4,288,502 | 9/1981 | Avigal et al. | 429/111 |
| 4,296,188 | 10/1981 | Hodes et al. | 429/111 |
| 4,315,973 | 2/1982 | Manassen et al. | 429/111 |
| 4,368,216 | 1/1983 | Manassen et al. | 427/74 |

OTHER PUBLICATIONS

G. Hodes et al., "Electrocatalytic Electrodes for the Polysulfide Redox System", *J. Electrochem. Soc.*, vol. 127, p. 544-549 (Mar. 1980).

J. Manassen et al., "Photoelectrochemical Storage Cells: the Importance of the Second & Third Electrodes," p. 34-37 of *Semiconductor Liquid-Junction Solar Cells*, Proceedings vol. 77-3, The Electrochemical Society, Princeton, N.J. (1977).

*Nature* 261, No. 5559, pp. 403-404 (1976).

*Journal of Electrochemical Society* 124, 532 (1977), Manassen et al.

*Primary Examiner*—Aaron Weisstuch
*Attorney, Agent, or Firm*—Sandler & Greenblum

[57] ABSTRACT

A system for storing electrical energy having a storage compartment containing a storage electrode made of tin, and further containing an alkaline sulfide solution containing tin in a soluble form.

A battery made of a plurality of cells. Each of the cells is positioned within a container and separated by separating members adapted to slide within the container and includes a storage and a second compartment separated by a membrane. The membrane is adapted to compensate for volumetric variations within each of the compartments.

A system comprising a plurality of electrolyte containing cells separated by separating members having orifices therein which permit fluid communication between the electrolyte of each of the cells.

A battery made of a plurality of individual cells. Each of the cells comprises means for venting hydrogen generated in each of the cells.

A method of assembling a battery made of a plurality of cells.

28 Claims, 7 Drawing Figures

STORAGE OF ELECTRICAL ENERGY WITH TIN ELECTRODE SYSTEM, STORAGE APPARATUS, AND METHOD OF FORMING SUCH APPARATUS

BACKGROUND OF THE INVENTION

1. Field of the Invention

The invention relates to a system for storing electrical energy which may be either exteriorly supplied or generated in situ by a photoconversion electrode. The invention relates to one particularly preferred type of storage system, as well as to various structural embodiments for batteries including storage systems and to methods of constructing said systems.

2. Description of Prior Art

Numerous systems for the storage of electrical energy are described in textbooks and in the patent literature. Most such systems are based on two solid electrodes in a liquid electrolyte with the electrodes undergoing redox reactions essentially in the solid state. In a newly-developed system, the redox cell comprises two liquid redox systems separated by a membrane. In this system, the redox reactions occur in the liquid at metal or carbon electrodes. Also, hybrid systems have been developed recently, where two liquid systems are separated by a membrane, and in one compartment the redox reaction occurs by the plating out of a metal. The best known examples of such systems are the zinc/bromine and zinc/chlorine batteries.

U.S. Pat. No. 4,064,326 describes an in situ storage system as it is used in photoelectrochemical cells. This patent discloses various storage systems, including a system in which the storage electrode is formed of solid tin. In this system, the storage compartment includes an alkaline sulfide solution. The electrochemical reaction disclosed in the patent is:

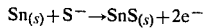

$$Sn_{(s)} + S^- \rightarrow SnS_{(s)} + 2e^-$$

Thus, in such a system, during discharge, solid tin is disclosed as being converted to solid tin sulfide with the release of electrons. The reaction as set forth above appears to suggest a redox system in which both the reactant tin and product tin sulfide are present in the solid phase with the reaction occurring at the electrode itself. While the patent discloses the use of a membrane generally for separating the storage compartment from the rest of the cell, the use of a membrane is clearly not always necessary and is not suggested in such a system. Furthermore, when used in conjunction with a photoconversion system having a polysulfide electrolyte, one would not normally have considered a membrane to be necessary by virtue of the "solid state" reaction which was thought to occur.

Similar systems have been described in U.S. Pat No. 4,128,704. In *Nature*, Vol. 261, No. 5559, pp. 403-404 (1976), the Ag/Ag$_2$S system was described. The *Journal of the Electrochemical Society*, Vol. 124, 532 (1977) discloses Sn/stannate and Zn/zincate systems. Bipolar electrodes have been described in *Proc. Electrochem. Soc.*, Vol. 73-3, page 34 (1977) and in U.S. Pat. No. 4,315,973, the disclosure of which is incorporated herein.

Many membrane systems suffer from the fact that very high demands are placed on the selectivity of the membrane, because mixing of the redox systems leads to deterioration of the storage system. Other systems which do not suffer from this disadvantage tend not to be compatible with stable photoelectrochemical electricity generators, and therefore are not suitable for in situ generation of photoelectrochemically generated electrical energy. No satisfactory system has been described where nonselectivity of the membrane can be tolerated, which is suitable for in situ generation in a photoelectrochemical conversion system, and which lends itself easily to bipolar connections.

SUMMARY OF THE INVENTION

According to the present invention, a novel system for storing electrical energy is provided which comprises simple and inexpensive construction materials. The system can be advantageously used for the storage of electrical energy which is generated independently or exteriorly of the system, such as by solar or wind energy conversion, for instance, or for the storage of energy generated in the system itself. The storage electrode is in principle an electrode of tin metal or tin sulfide submerged in an alkaline sulfide solution containing tin in solution. The reactions occurring in the system are:

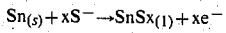

$$Sn_{(s)} + xS^- \rightarrow SnS_{x(l)} + xe^-$$

While the electrode is described as being made of tin alone, the disclosure is not necessarily limited to this embodiment, since depending upon the phase of the charge-discharge cycle, the electrode may contain substantial amounts of solid tin sulfide. Furthermore, depending on the initial constitution of the electrode, excess tin sulfide may be present which remains throughout the charge-discharge cycle. For purposes of this application, therefore, the cell including the storage compartment will be described with reference to an open-circuit situation. Furthermore, although reference is made to the presence of tin in solution, this is not intended to indicate that the tin is necessarily present as free or uncomplexed tin, but rather the term "tin" is used as a shorthand designation for the tin as it is present in the alkaline sulfide solution. It is believed that the tin is very possibly present as SnS$_{2(l)}$ (tin sulfide), although Applicants do not wish to be bound in this respect. The tin/tin sulfide reaction is reversible in this system, and its potential, depending on how much tin is dissolved in the solution, varies between 0.9 and 1.0 volts negative with respect to the normal hydrogen electrode. The second redox system may typically comprise a polysulfide solution which is a solution of sulfur in an alkaline sulfide solution. The potential of the sulfur/sulfide reaction depends on the sulfur/sulfide ratio, and varies between 0.4–0.6 volts negative with respect to the normal hydrogen electrode, and therefore a storage battery combining these two systems can generate between about 0.4–0.6 volts. A membrane is necessary because the solid tin chemically reacts with polysulfide to give tin in its soluble form without generating electrons. Therefore, no excess sulfur should be present in the compartment containing the tin electrode. If some sulfur does pass through the membrane, this reaction does not lead to deterioration of the storage system, but only to a temporary decrease in efficiency.

According to the invention, a storage system for storing electrical energy is disclosed which comprises a storage compartment. A storage electrode comprising tin is positioned in the storage compartment. The compartment further contains an alkaline sulfide solution containing tin in a soluble form. The storage compartment is at least partially enclosed by a membrane. The storage system is adapted to store electrical energy generated within or external to the system.

In one embodiment of the invention, the storage system further comprises a second compartment. The second compartment houses a second electrode and a polysulfide solution, with the membrane being positioned to separate the storage and second compartments. The second electrode in the second compartment may be a counterelectrode, and the second compartment may further comprise a semiconductor photoconversion electrode. In this embodiment, the semiconductor photoconversion electrode is adapted to be electrically connected to the storage electrode.

The sulfide solution in the storage compartment contains from about 0.1–10 M tin in a soluble form.

The counterelectrode in the second compartment comprises a sulfided brass substrate or a sulfide of cobalt applied to a conductive base.

The membrane used is a cation-selective membrane or a conventional separator, as used in alkaline batteries.

The membrane is adapted to permit the passage of cations from the storage compartment into the second compartment while resisting passage of polysulfide ions from the second compartment into the storage compartment.

The system may comprise a plurality of individual cells each arranged consecutively in an elongated container and each comprising a storage electrode, a membrane, a counterelectrode, and a photoconversion electrode. Adjacent cells within the container are electrically connected to one another. As indicated by the accompanying drawings, no external electrical connections between cells are required, the connection between adjacent cells being achieved internally.

In such a system, the storage electrode of each of the cells is electrically connected to the counterelectrode of the next adjacent cell. The membrane of each of the cells may be made free to move within the container while maintaining the separation between the compartments of each cell, thereby compensating for volume changes in the container. The membranes may also be made out of a flexible material such that the membrane bulges in response to volumetric variations.

The storage system may further include a fluid connection between the storage and second compartments whereby electrolyte in each of the compartments can escape therefrom during expansion of the system.

A tube may be used for this purpose which is adapted to place the storage and second compartments in fluid communication with one another.

According to another aspect of the invention, a system is provided which comprises a plurality of cells, each of the cells being positioned within a container and separated by separating members within the container. Each of the cells comprises a storage and a second compartment separated by a membrane. The membrane is adapted to compensate for volumetric variations within each of the compartments.

As noted previously, the battery may further comprise means for placing the storage and second compartments in fluid communication.

The means for providing fluid communication between each of the compartments in a cell may be a hole drilled in each of the membranes, or a tube as noted previously.

The container wall may preferably comprise openings for filling each of the compartments with electrolyte fluid, which facilitates assembly of the system.

According to another aspect of the invention, in a system comprising a plurality of cells, each of the cells comprises means for venting hydrogen generated therein. For example, hydrogen-permeable tubing may be used to connect the storage and second compartments of each cell.

According to yet another aspect of the invention, each cell comprises a container which houses a tin storage electrode and an alkaline sulfide solution. The container is closed at one end thereof by a membrane, and is positioned within an outer compartment of the cell comprising a polysulfide solution, a photoconversion electrode, and a counterelectrode. In this embodiment, the counterelectrode is constituted by the interior wall of a disk closing off one end of the cell. A disk closing off the opposite end of the cell may also be provided which is conductive and electrically connects the photoconversion electrode to the storage electrode.

The outer wall of the container is provided with an orifice therein for filling the outer compartment with the electrolyte. A plurality of the cells may be positioned adjacent to one another and separated by disks.

According to yet another embodiment, a cell is formed of two individual compartments, each cell comprising two end disks at opposite ends thereof. Two bored disks are provided which are adapted to be clamped between the end disks, and a membrane is positioned to be held between each of the bored disks, whereby a compartment is formed on each side of the membrane.

The cell comprises electrolyte in each of the compartments and further comprises at least one electrode in each compartment.

Each of the end disks supports at least one electrode and is in electrical contact therewith.

One of the end disks may be made transparent so as to permit radiation to enter the compartment containing the photoelectrode.

In another embodiment of the invention, the separators between each of the cells may themselves have small holes bored therein for purposes of permitting electrolyte to expand between the cells as a result of temperature variations. In this embodiment a reservoir may additionally be provided into which excess electrolyte may expand. To protect the electrolyte from contamination, a layer of oil or other electrolyte-immiscible material may be provided to float on top of the electrolyte in the reservoir.

The invention further relates to a method of assembling a battery comprising a plurality of cells. The method comprises:

(a) providing a container adapted to receive each of the cells; and (b) inserting each of the cells into the container. The container comprises at least one orifice therein and electrolyte is added into the container and into each of the cells through the orifices provided in the wall of the container. As was the case previously, each of the cells comprises a container containing a storage electrode, an electrolyte, a membrane closing off at least a portion of the container, and at least one second electrode.

According to one embodiment, the assembly method entails filling the envelope with a liquid electrolyte and subsequently inserting each of the cells within the envelope. Using this technique, each of the cells is positioned within the envelope while permitting excess liquid to escape from each of the cells by inserting a hollow needle along the periphery of an O-ring positioned along a disk on one side of the cell.

DESCRIPTION OF PREFERRED EMBODIMENTS

Figure 1:
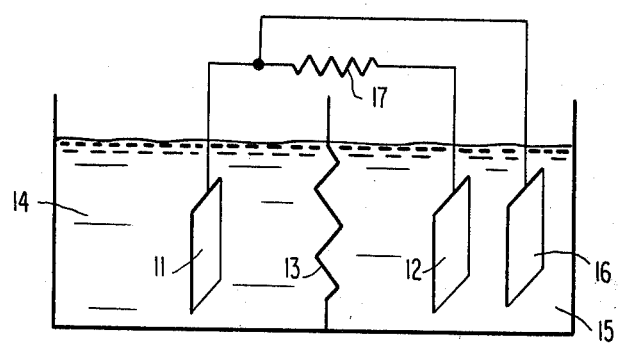
FIG. 1 is a schematic drawing of a storage battery according to the invention.

FIG. 1, not drawn according to scale, schematically illustrates a storage battery according to the invention, including tin storage electrode 11, and catalytic counterelectrode 12 for use in a polysulfide solution as disclosed in U.S. patent application Ser. No. 118,761, now abandoned. Compartment 14 contains an alkaline sulfide solution which contains dissolved tin, while compartment 15 contains an alkaline polysulfide solution. When electrodes 11 and 12 are connected through load 17, electrode 11 reacts with the sulfide in the solution such that electrons flow through load 17 to electrode 12, where the sulfur in the solution is reduced to sulfide. Electroneutrality is preserved by the flow of alkali cations from compartment 14 through membrane 13 into compartment 15. During charging, a countervoltage is applied, bypassing load 17, and sulfide is oxidized to sulfur at electrode 12, while electrons flow to electrode 11 where tin sulfide is reduced to tin. During this phase of the operation, alkali cations flow from compartment 15 through membrane 13 back to compartment 14. Instead of preserving electroneutrality by virtue of the flow of alkali cations flowing through the membrane in one direction, electroneutrality may also be preserved by sulfide ions flowing in the opposite direction. However, when polysulfide ions move from compartment 15 to compartment 14, tin in compartment 14 is dissolved without providing electrical energy. This reaction is, in effect, a self-discharge reaction. It is one of the advantages of the invention that polysulfide ions appear to be very sluggish in passing through the membrane such that instead of ion exchange membranes, conventional battery separators may also be used, especially when acidic groups are grafted onto the separator.

In the photoconversion mode, a semiconducting photoconversion electrode or photoelectrode 16 is introduced into compartment 15 and connected by conductive means with electrode 11. Under illumination, electrons from electrode 16 partially charge electrode 11 and partially flow through load 17 to electrode 12, the proportion of current being dependent on the value of the load resistance 17. Without illumination, electrons flow from electrode 11 through load 17 to electrode 12, and not to electrode 16, because of the diode characteristics of electrode 16. It is an advantage of the photoconversion mode that, under conditions of varying illumination, the current through load 17 stays constant, while with a varying load 17, the system automatically regulates the ratio of current flowing through load 17 and into storage.

It is an advantage of the invention that the voltage of the tin storage system is particularly suited to the particular photoconversion system disclosed herein in that a single photoelectrode charges a single storage electrode.

Electrode 11 may be initially simply a piece of tin foil; however, it is preferably in the form of porous tin, which can be prepared according to well-established methods. For example, it is possible to plate tin onto a porous conducting substrate like porous carbon or to press tin powder and a watersoluble salt together at an elevated temperature and to leach out the salt afterwards. It is also possible to press, according to this system, sulfided tin powder, which in solution converts the electrode to solid tin, with the sulfided tin going into solution. The electrode may be strengthened by providing a gauze of suitable material and/or a binder, which is resistant to the chemical and electrochemical environment in the battery. Although there is very little hydrogen evolution in this system, such evolution may be repressed even further by either using materials with a high hydrogen overpotential in the construction, or masking any construction materials with low hydrogen overpotential with a suitable insulating masking agent. Further repression may be obtained with conventional additives which repress hydrogen evolution, such as quaternary ammonium bases and the like.

Counterelectrodes which are catalytically active in polysulfide solutions are described in aforesaid U.S. patent application Ser. No. 118,761, the description of which is hereby incorporated by reference. For purposes of this invention, it is preferable to use either sulfided brass or cobalt sulfide, although other catalysts can be used as well. Brass, which is a zinc-copper alloy, partially corrodes in a polysulfide solution, and copper sulfide is the active catalyst which is formed as a result of the corrosion, and has a high surface area while it is held in the zinc matrix. Cobalt sulfide can be deposited on a conducting substrate, by first depositing hydrous cobalt hydroxide, which is converted to high-surface cobalt sulfide by treatment with sulfide solution. The resulting cobalt sulfide may then be used as a counterelectrode.

The membrane of the invention may be either a cation exchange membrane (e.g., NAFION) or a battery separator, suitable for use with alkaline batteries, preferably with strongly cation exchanging groups in order to decrease the rate of passage of polysulfide ions as compared to that of alkali ions. Generally speaking, the membrane used must decrease the flow of polysulfide ions relative to the alkali ions for the reasons set forth above. A high electrical conductivity of the membrane is of great importance for a storage battery, and this is an additional advantage when using conventional battery separators instead of ion-specific membranes.

The solution composition in both compartments can be varied widely, and depends on the performance demanded of the battery. If a higher voltage is required, it is possible to use a solution substantially free of dissolved tin in the tin electrode compartment (in the charged condition), while using a high $S/S^{--}$ ratio in the polysulfide compartment so as to give an open-circuit voltage of about 0.6 volts. The disadvantage of this arrangement is that the output voltage may change significantly as a function of the degree of charging. For use with the photoconversion mode, on the other hand, the charging voltage has to be low enough for the photoelectrode to be able to charge the storage electrode, and it may be advantageous to use a sulfide solution which contains dissolved tin and a polysulfide solution having a S/S$^{--}$ ratio of less than 1. This condition results in a discharge voltage of about 0.4 volts, but the change in voltage as a function of charge is much less. Typical dissolved tin concentrations are on the order of 1.0–2.0 M. in the fully discharged state.

As a consequence of ion transport through the membrane and existing concentration differences at both sides of the membrane, water transport occurs from one compartment to the other during the charge and discharge cycles, and the resulting changes in volume may be compensated for in several ways. According to one embodiment, it is possible to attach the membrane in such a way that it has some freedom of movement, e.g., elasticity and/or flexibility, resulting in bulging, so that it adjusts to changes in volume of the two compartments. According to another embodiment, it is possible to establish a liquid connection between compartments 14 and 15, which connection may be in the form of a siphon or a hole above the initial liquid level. Such a connection acts as a pressure equalizer, and in case one of the liquid levels gets too high, liquid will flow from one compartment to the other. This overflow acts as a self-discharge, but does not have any other detrimental effects on the functioning of the battery.

The photoelectrodes which may be used in the system of the invention are those, for example, which are described in U.S. Pat. Nos. 4,296,188 and 4,368,216, the disclosures of which are hereby incorporated by reference. The photoelectrodes are most preferably made of CdSe or Cd(Se,Te) on a conductive support, although many other systems may be used. In order to obtain maximum efficiency from the system, the maximum power voltage of the photoelectrode must be slightly higher than the equilibrium voltage of the tin storage system.

Figure 2:
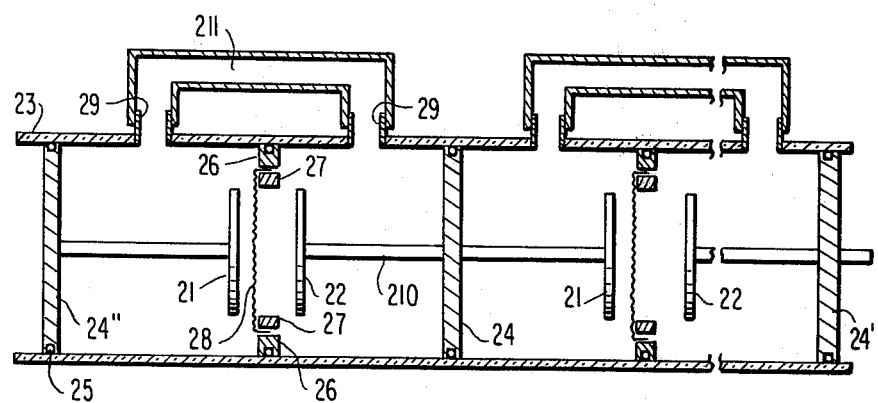
FIG. 2 illustrates a battery system comprising a plurality of storage batteries according to the invention.

As may be seen from FIG. 2, according to a preferred embodiment of the invention, a storage system is provided which comprises a group of modules, connected in series in a manner described in U.S. Pat. No. 4,315,973, the disclosure of which is hereby incorporated by reference. A tubular container 23 is provided which preferably comprises a transparent glass envelope with disks 24 inserted therein. These disks may be made either of metal or of a non-conducting material. A groove is provided at the peripheral edge of these disks 24 in which a flexible O-ring 25 or other sealing member is inserted so as to ensure a leakproof yet slidable seal with the inner surface of the tube 23. An electrically conductive connector 210 connects tin electrode 22 with catalytic counterelectrode 21, while membrane 28 is clamped between two concentric ring members 27 and 26. Ring 26 has the same groove and sealing arrangement as that of disk 24. Modules are thus formed which comprise disk 24, electrically conductive connector 210 (preferably insulated to prevent undesired reactions), tin electrode 22, and catalytic electrode 21, and each of these modules may then be inserted into the tubular cylinder. The membrane assembly 26, 27, 28 is inserted into the cylinder, after which another module is inserted, each of these operations being repeated until the desired number of cells have been formed in the cylinder. The cylinder is then closed at both ends with disk 24' at one end supporting a tin electrode 22, and disk 24" at the other end carrying a catalytic electrode 21. As indicated by the accompanying drawings, no external electrical connections between cells are required, the connection between adjacent cells being achieved internally.

Openings 29 are provided in the cylinder for filling each of the cells, the tin-containing compartments being filled with a sulfide solution while the catalytic counterelectrode compartments are filled with an alkaline polysulfide solution. After the cylinder has been filled, openings 29 are connected in pairs through a length of tubing 211 as illustrated in FIG. 2. Tubing 211 serves a dual purpose. First, it equalizes the pressure in both compartments by equalizing volume fluctuations. Furthermore, tubing 211 acts as a safety overflow when the volume changes become too large. Tubing 211 may preferably and under certain circumstances be made of a material which is permeable to hydrogen such that it also serves to vent small quantities of hydrogen which may be generated in the system.

Figure 3A:
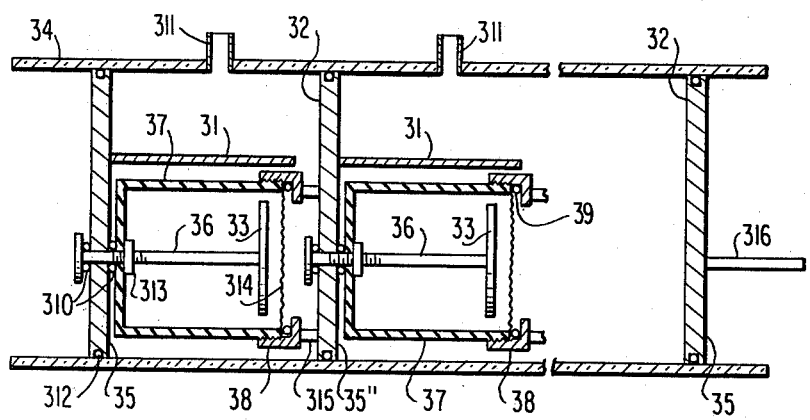
FIG. 3A illustrates an alternative embodiment of the battery shown in FIG. 2 further containing photoconversion electrodes.

A preferred embodiment of the photoconversion mode of the battery is illustrated in FIG. 3A. In this embodiment, a tubular transparent container 34 is provided which preferably assumes the form of a transparent glass tube. The container contains separators 35" having the same sealing arrangement with sliding seals 312 as the separators 24 in FIG. 2. Photoelectrode 31 is conductively connected with separator 35. The photoelectrode is preferably flat as seen in cross-section in FIG. 3, although curved and other configurations are obviously possible. A container 37 made of insulating material is connected to separator 35 by connector 36 and nut 313. Washers 310 serve to prevent leakage. Tin electrode 33 is connected with connector 36, the container 37 being filled with the required sulfide solution and closed with membrane 314 by means of insulative screw cap 38 and washer 39. An initial module thus constructed with end wall 35 is inserted into tubular envelope 34. Spacers 315, which are part of screw cap 38, touch the next module and hold both in place. The left hand sides of separators 35" are covered with electrocatalyst 32, while the other sides of these separators are preferably coated with an insulated coating. As many modules may be inserted as is required, and the tube is closed off ultimately with a final separator 35, which carries the electrocatalyst 32 at the inner side and connector 316 at the outer side. Separators 35" do no necessarily have to be made of conductive material. If they are made of nonconductive material, conductor 36 has to be connected electrically with photoelectrode 31. In such an embodiment, electrocatalyst 32 must be deposited on a conductive layer, such as by electroless plating, which makes electrical contact with photoelectrode 31 and connector 36.

Figure 3B:
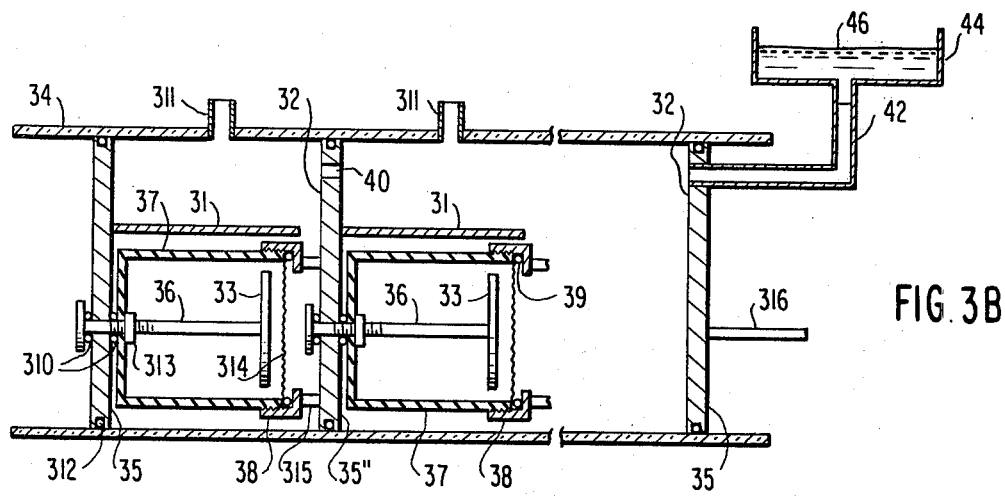
FIG. 3B illustrates an alternative embodiment of FIG. 3A.

After the cell has been assembled, it is filled with a polysulfide solution via openings 311. While FIGS. 3A and 3B illustrate the use of openings 311, such openings are not necessary, and it is also possible to pour the polysulfide solution into the tube or container first, and to slide the separators 35", with container 37 attached, inside the tube while letting trapped air escape via a hollow needle, inserted between O-ring 312 and the tubular container wall.

Alternatively, as was noted previously, each of separators 35" may be drilled with a small hole 40 on the order of 0.1–0.5 mm. such that the voltage of the cells is not substantially affected. Such an embodiment is shown in FIG. 3B. As shown, each of separators 35"

optionally includes a small hole which in effect permits electrolyte to flow between the cells. Upon expansion as a result of temperature increase, the electrolyte expands beyond end separator 35 through line 42 into reservoir 44. So as to prevent contamination of the electrolyte, the electrolyte may be covered with a layer of insulating fluid such as oil or like material 46 which floats on the surface of the electrolyte. The insulating material used is preferably non-contaminating and immiscible with the electrolyte. An orifice having a small diameter is preferred since the orifice must be small enough to act as a high resistance when filled with electrolyte as compared to the external load on the system.

There are many possible variations of the above embodiment. For example, container 37 may be made of a flexible material, or out of the membrane itself. Such an arrangement allows for expansion and contraction of each of the compartments during the various phases of battery use. Counterelectrode 32 can be made parallel to photoelectrode 31 (such as by laying it flat against the inner wall of the container), and instead of washers 310, connector 36 may be welded to separator 35. Other variations of a technical nature, falling within the scope of the invention, should be clear to one of ordinary skill in the art.

The energy density of the inventive storage system is comparable to that of alternative storage means. As it is a hybrid redox system, the energy density is dependent upon the amount of sulfur and sulfide which can be dissolved. The tin electrode is preferably of such a composition and quantity (mass) that its capacity is sufficient to carry the amount of maximum charge as defined by the solution compositions.

For concentrations of sulfur and sulfide of 3 molar, energy densities in the storage compartment may be calculated to be on the order of about 60 Whr/l. for one half-cell, which corresponds to 30 Whr/l. for the two half-cells together. Especially when used in the photoconversion mode, this energy density is appreciable, because conversion as well as storage is done in one and the same system, which has the storage capacity of a separate storage system, which would have had to be used with any other conventional photoconversion system.

EXAMPLE 1: STORAGE MODULE

A storage electrode is formed by thoroughly mixing 2 ml. of tin dust and 1 ml. of sodium chloride, which mixture is then pressed in a 1-inch-diameter die at a pressure of 12 tons at 200° C. A hole of 3.1 mm. diameter is drilled through the center of the disk, and the disk is boiled in distilled water for several hours. According to the alternative embodiment shown in FIG. 4A, this disk 43 may then be connected with a stainless steel plate 41 by means of a stainless steel screw 42 having a 3 mm. diameter with all exposed stainless steel being masked with insulating paint. The catalytic counterelectrode is formed out of two solutions, one 0.1 M $CoCl_2$ and the other 0.2 M KOH, which are mixed and precipitated in the form of cobalt hydroxide, which is then painted on a stainless steel plate 44 which is previously roughened by sand-blasting to provide layer 45. Two polyvinylchloride plates 46 having a thickness of 12 mm. are provided, and are drilled with holes of 4 cm. diameter. The PVC plates, stainless steel plates, and membrane 47 (e.g., RAI p 1010) are clamped together in the order shown in FIG. 4A with gaskets 48. Resulting cavity 49 is filled with a solution of 2 M KOH and 2 M $Na_2S$ to form the storage compartment, while cavity 410 is filled with a solution of 2 M KOH, 2 M $Na_2S$, and 2 M S as the electrolyte for the counterelectrode. By short-circuiting plates 41 and 44, currents of 150 mA can be sustained. By connecting plates 41 and 44 over a 50-ohm resistor, a current of 10 mA may be drawn for several days, and recharging is done at the same current. Charging is done at a voltage of 600 mV, while the discharge voltage is 440 mV. The open-circuit voltage is 520 mV, while the internal resistance is less than 1 ohm.

EXAMPLE 2: BATTERY OF STORAGE MODULES

Figure 4A:
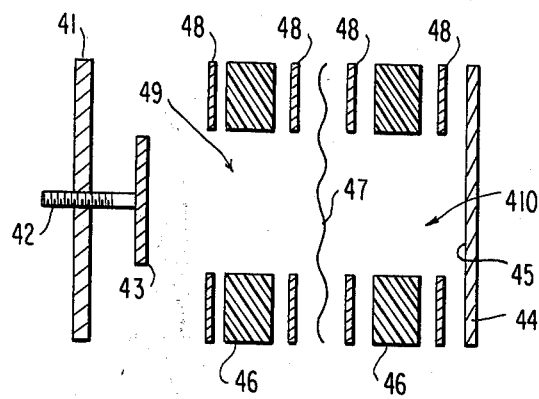
FIGS. 4A and 4B illustrate different bipolar connectors for use in the battery system of the invention.
Figure 4B:
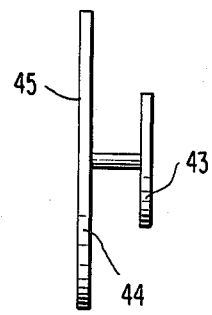

A cell such as that shown in FIG. 4A is constructed; however, a bipolar connector such as is shown in FIG. 4B is used such that five cells could be clamped together by means not shown to form a battery. The battery is connected with a photoelectrochemical cell exposed to the sun, the two components being connected through a resistance such that, upon exposure to illumination, the photoelectrochemical cell generates a current across a load as well as charging the battery (see the circuit of FIG. 1). At night, the battery discharges the stored energy. This cell, without the battery, delivers a voltage of 2.5 volts at maximum power, and a current at a maximum power of 28 mA. The combined system delivers a constant current of 5 mA at a voltage of 2.2 volts for many months, day and night, cloudy as well as sunny days.

Figure 4C:
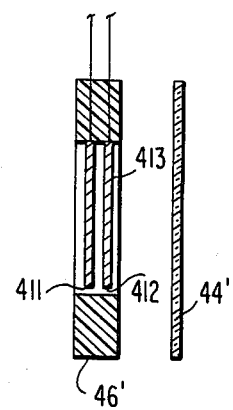
FIG. 4C illustrates an alternative embodiment of FIG. 4A.

EXAMPLE 3: PHOTOCONVERSION-STORAGE MODULE 20 grams of tin dust is reacted with 40 ml. of 6 M KOH solution, 2 M $Na_2S$ and 6 M S. The tin appears to react with the sulfur and about 3 M tin dissolves. The remaining sulfur appears to react with the remaining tin dust, covering the tin particles with a tin sulfide layer. 2 ml. of these particles are pressed with 1 ml. of NaCl and treated as described in Example 1. End plate 44 of FIG. 4A is replaced by a transparent PVC plate 44', and, as may be seen from FIG. 4C, a 6 cm² photoelectrode 412 and a 6 cm² CoS coated counterelectrode 411 are inserted in cavity 410 through separator 46' with the CdSe layer 413 facing the transparent plate 44. Plate 41 is conductively connected with the CdSe photoelectrode. The cell is assembled as in FIG. 4A, and electrodes 411 and 412 are connected across a 30-ohm resistor. Photoelectrode 412 is illuminated with a tungsten/halogen light source of about AM 1 equivalent solar intensity, and cycled between twelve hours light and dark cycles. The cell produces a constant current of 10 mA at 410 mV during the light as well as dark cycles. The open-circuit voltage is 420 mV.

EXAMPLE 4: CONTAINED STORAGE BATTERY

A battery is constructed as shown in FIG. 2 using a glass tube of 4 cm. external diameter as container 23. Separators 24 are 3 mm. thick PVC disks, and stainless steel screws are used as connectors 210. Tin electrode 22 is prepared as described in Example 1, and stainless steel disks 21 coated with cobalt sulfide in the way described in Example 1 are used. Rings 27 and 26 are made of PVC, and are 3 mm. thick each. The membrane is clamped between the PVC rings and made leakproof with TEFLON tape. The electrode modules and membrane assemblies are inserted into the tube as shown in FIG. 2. Distance between separators 24 and membrane 28 is 3.5 cm. and the lengths of screws 210 are chosen such that the distance between the electrodes and the membrane surface is minimal without them actually touching each other. The tin electrode compartments are filled with a solution of 2 M $Na_2S$, 2 M KOH, while the other compartments are filled with a solution of 2 M $Na_2S$, 2 M S, and 2 M KOH. Openings 29 are connected in pairs through silicone rubber tubing. A battery of five cell pairs gives an open-circuit voltage of 2.6 volts. The battery is cycled at 50 mA, with the charging voltage being 625 mV and the discharge voltage being 400 mV.

EXAMPLE 5: CONTAINED PHOTOCONVERSION-STORAGE BATTERY

A photocell having in situ storage as depicted in FIG. 3A is constructed. Separators 35 are 3-mm.-thick stainless steel disks to which a 6 $cm^2$ photoelectrode 31 is welded. The photoelectrode side of the disk is masked off well with an insulating paint. Containers 37 are transparent PVC cylinders, and tin electrodes 33 are prepared as described in Example 3. Connector 36 is a stainless steel screw of 3 mm. diameter, which is masked off with insulating paint, as well as nut 313. Container 37, carrying electrode 33, is attached to separator 35 as shown, and container 37 is then filled with a solution obtained by reacting a solution of 2 M KOH, 2 M $S^-$, and 6 M S with excess tin metal as described in Example 3. The container is then closed off with membrane 314, using screw-cap 38. Separators 35 are coated with CoS to form layer 32 as described in Example 1 at the side not carrying the photoelectrode. Five of these modules, containing separator 35, photoelectrode 31, tin electrode 33, and filled container 37 are slid into tube 34, which has a 4 cm. outer diameter and is made of glass. The glass tube is closed off with a separator 35″ carrying only catalyst 32 and connector 316. A polysulfide solution 2 M KOH, 2 M $Na_2S$, and 2 M S is poured through openings 311, which are then closed off with a piece of clamped silicon tubing. The cell is exposed to the sun, and supplies a constant current of 10 mA at a voltage of 2 volts in the presence, as well as absence, of sunlight over many months.

Although the invention has been described with respect to particular electrodes having particular compositions, as well as electrolytes having particular compositions, with reference to particular structure, it is to be understood that the invention is not limited to the specifics disclosed, but extends to all equivalents falling within the scope of the claims.

What is claimed is:

1. A system for storing electrical energy comprising a plurality of individual cells positioned in a container, each cell comprising a storage compartment containing a storage electrode comprising tin, and further containing an alkaline sulfide solution containing tin in a soluble form, said storage compartment being at least partially enclosed by a membrane, each of said cells further comprising a second compartment, said second compartment containing a second electrode and a polysulfide solution, said membrane separating said storage and said second compartments, wherein the membrane of each of said cells is free to move within said container while maintaining the separation between the compartments of each cell, thereby compensating for volume changes in said container.

2. The system as defined by claim 1 wherein said storage compartment is adapted to store electrical energy generated within or external to said system.

3. The system as defined by claim 1 wherein said second electrode in said second compartment is a counterelectrode, and wherein said second compartment further comprises a semiconductor photoconversion electrode, said semiconductor photoconversion electrode being adapted to be electrically connected to said storage electrode.

4. The system as defined by claim 3 wherein said counterelectrode in said second compartment comprises a sulfided brass substrate.

5. The system as defined by claim 3 wherein said counterelectrode in said second compartment comprises a sulfide of cobalt.

6. The system as defined by claim 3 wherein said system comprises a plurality of individual cells, each comprising said storage and said second compartments, each cell arranged consecutively in an elongated container and each comprising said storage electrode, said membrane, said counterelectrode, and said photoconversion electrode, adjacent cells within said container being electrically connected to one another.

7. The system as defined by claim 6 wherein said storage electrode of each of said cells is electrically connected to the counterelectrode of the next adjacent cell.

8. The system as defined by claim 1 wherein said membrane is a cation-selective membrane or battery separator.

9. The system as defined by claim 1 wherein each of said membranes is elastic.

10. The system as defined by claim 1 wherein said sulfide solution in said storage compartment contains from about 0.1–10 M tin in a soluble form.

11. The system as defined by claim 1 wherein said membrane is adapted to permit the passage of cations from said storage compartment into said second compartment while resisting passage of polysulfide ions from said second compartment into said storage compartment.

12. A system comprising a plurality of individual cells positioned within a container and separated by separating members adapted to slide within said container, each of said cells comprising a storage and a second compartment separated by a membrane, said membrane being adapted to compensate for volumetric variations within each of said compartments.

13. The system as defined by claim 12 further comprising means for placing said storage and second compartments in fluid communication.

14. The system as defined by claim 13 wherein said means for placing each of said compartments in fluid communication comprises a hole drilled in each of said membranes.

15. The system as defined by claim 13 wherein said container comprises openings for filling each of said compartments with electrolyte fluid.

16. The system as defined by claim 15 wherein said means for placing each of said compartments in fluid communication comprises a tube connected to said openings for placing the compartments of each cell in fluid communication.

17. A photoelectrochemical cell comprising a storage compartment comprising a tin storage electrode and an alkaline sulfide solution, said compartment being closed at one end thereof by a membrane, said storage compartment being positioned within a second compartment comprising a polysulfide solution, a photoconversion electrode, and a counterelectrode, wherein said counterelectrode is constituted by the interior wall of a disk closing off one end of said cell.

18. The cell as defined by claim 17 further comprising a disk closing off the opposite end of said cell, wherein said disk closing off the opposite end of said cell is conductive and electrically connects said photoconversion electrode to said storage electrode.

19. The cell as defined by claim 18 comprising an outer wall having an orifice therein for filling said second compartment with said electrolyte.

20. The cell as defined by claim 19 wherein said outer wall of said cell is constituted by the wall of a tubular container containing a plurality of said cells positioned adjacent to one another and separated by said disks.

21. The cell as defined by claim 17 wherein said storage compartment and said membrane are formed of the same material.

22. A system comprising a plurality of individual cells, each of said cells comprising at least two electrodes and a liquid electrolyte, said cells being serially positioned within a container and separated from one another by a separating member, said separating member comprising an orifice therein for placing adjacent cells in fluid communication to allow for volumetric changes in each of said cells, wherein said container is tubular and each of said separating members is a disk, said system being bounded at each end of said cylinder by an end disk, wherein one of said end disks comprises an orifice therein and said system further comprises a reservoir in fluid communication with said orifice of said end disk whereby fluid leaving said container due to expansion enters said reservoir.

23. The system as defined by claim 22 wherein said reservoir comprises an insulating fluid adapted to float on said electrolyte in said reservoir, said insulating fluid being substantially immiscible with said liquid electrolyte.

24. The system as defined by claim 23 wherein each of said cells is a photoelectrochemical cell and wherein at least one of said electrodes is a photoelectrode and another of said electrodes is a counterelectrode.

25. The system as defined by claim 24 wherein each of said cells further comprises a storage electrode.

26. A system comprising a plurality of individual cells positioned within a container and separated by separating members adapted to slide within said container, each of said cells being electrically connected internally to an adjacent cell, each of said cells comprising a storage compartment and a second compartment separated by a membrane, said membrane being adapted to compensate for volumetric variations within each of said compartments.

27. A system for storing electrical energy comprising a storage compartment containing a storage electrode comprising tin, and further containing an alkaline sulfide solution containing tin in a soluble form, said storage compartment being at least partially enclosed by a membrane, further comprising a second compartment, said second compartment containing a second electrode and a polysulfide solution, said membrane separating said storage and said second compartments, further comprising a fluid connection between said storage and said second compartments whereby electrolyte in each of said compartments can escape from each of said compartments during expansion of said system.

28. The system as defined by claim 27 comprising a tube adapted to place said storage and second compartments in fluid communication with one another.

* * * * *